Aug. 18, 1970  H. HAUG  3,525,062
ALTERNATING-CURRENT MAGNET HAVING RADIALLY DISPOSED
LAMINATIONS ALONG THE MAGNET AXIS
Filed Dec. 12, 1967  2 Sheets-Sheet 1

INVENTOR.
Heinz Haug

Aug. 18, 1970  H. HAUG  3,525,062
ALTERNATING-CURRENT MAGNET HAVING RADIALLY DISPOSED
LAMINATIONS ALONG THE MAGNET AXIS
Filed Dec. 12, 1967  2 Sheets-Sheet 2
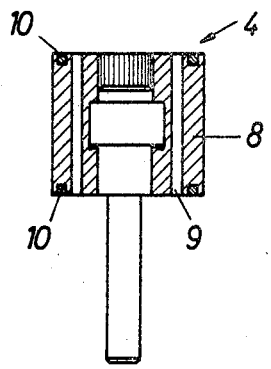
FIG. 3
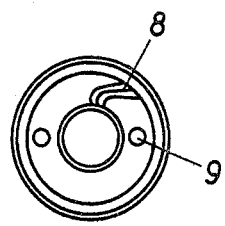
FIG. 4
FIG. 5
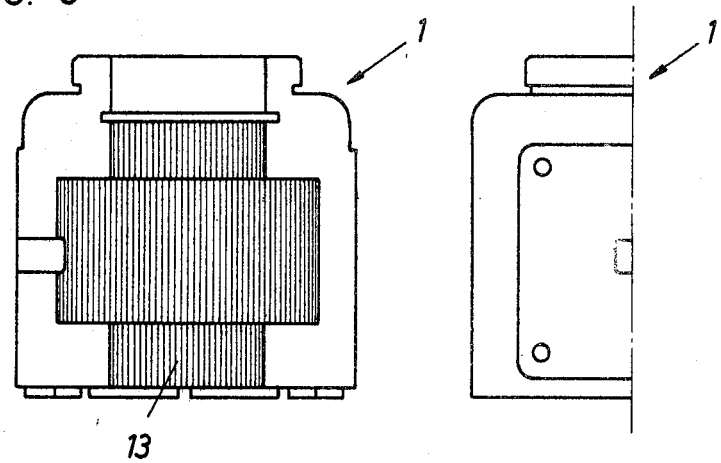
FIG. 6
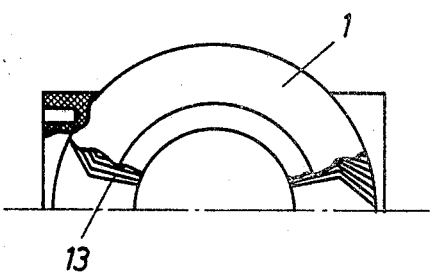
INVENTOR.
Heinz Haug United States Patent Office 3,525,062
Patented Aug. 18, 1970

3,525,062
ALTERNATING-CURRENT MAGNET HAVING
RADIALLY DISPOSED LAMINATIONS ALONG
THE MAGNET AXIS
Heinz Haug, Schwenningen, Germany, assignor to Binder Magnete K.G., Villingen, Black Forest, Germany, a corporation of Germany
Filed Dec. 12, 1967, Ser. No. 689,878
Claims priority, application Germany, Dec. 16, 1966,
B 90,349
Int. Cl. H01f 7/10
U.S. Cl. 335—249          9 Claims

ABSTRACT OF THE DISCLOSURE

An alternating current electromagnet for actuating a movable member, e.g., the closing member of a valve, within a pressure-tight tube, the pole core and the armature of said magnet being positioned within the tube and each comprising a stock of laminations having a cross section of substantially involuted configuration. The energizing winding and yoke of the electromagnet are positioned outside the tube in operative proximity with the pole core and armature.

---

My invention relates to an electromagnet for actuating a movable member within a pressure-tight tube. More particularly, the invention relates to an alternating-current electromagnet whose magnet coil is located outside of a sealed tube and acts upon a movable member inside the tube.

Electromagnets are frequently utilized in hydraulic and pneumatic systems to control the operation of valves and other movable members. In such cases, the armature of the magnet operates the valve or the movable member in the pressure-tight chamber or tube. For safe operation, the energizing winding of the electromagnet must, if at all possible, be positioned outside the pressure-tight chamber or tube. This is readily accomplished with direct-current magnets. The massive, i.e. single-piece, armature of such a direct-current magnet is located within the pressure-tight tube which is open toward the valve or other movable member to be controlled by the magnet and which is closed on the opposite side. The energizing winding and other components of the magnet system are positioned outside the pressure-tight tube.

There are no alternating current electromagnets which produce sufficient magnetic force when the pressure within the tube is relatively high. This is due to the fact that the pressure-tight tube of nonmagnetizable material between armature and yoke of the magnet constitutes too large an air gap so that the required magnetic force cannot be obtained within the tube where it is needed. Furthermore, with a conventional construction comprising a massive armature, the use of alternating current energization would cause excessive heating of the armature, which would further decrease the magnetic force produced by the magnet.

The principal object of the present invention is to provide a new and improved alternating-current magnet for actuation of valves and the like within pressure systems which, for given space requirements, furnishes considerably greater lifting force than heretofore obtainable and which affords being directly connected to the sealed space of the pressure system.

To this end, and in accordance with the invention, I provide the pole core and the armature of an alternating-current magnet within a pressure tube, and the energizing winding and yoke of such electromagnet outside the tube, and I form one or both of the pole core and the armature of a stack of sheet-metal laminations. The laminations extend in directions parallel to the axis and hence coincident with the direction of the magnetic flux, the stacking sequence being in the peripheral direction about this axis. Due to the laminated design of the armature and/or the pole core the iron losses, when operating with alternating current, are kept low so that a maximal feasible lifting force is obtainable with minimized spaced requirements of the magnet. The armature and the pole core, as well as the pressure-sealed tube containing them, may be given any desired cross section, although a circular cross section is preferable.

In section perpendicular to the axis, the shape of the laminations, for favorable space utilization, is preferably of a substantially involuted configuration.

According to further features of the invention, I provide one or more rings around each stack of laminations to hold the laminations of the stack together. I further provide a sleeve in the pole core and have a tappet mounted in the armature and extending into the sleeve.

The foregoing and other objects, advantages and features of the invention will be set forth in, and will be apparent from the following description of embodiments in conjunction with the accompanying drawings wherein:

FIG. 3 is a view, partly in axial section, of the armature of the electromagnet of the embodiment of FIG. 1;

FIG. 4 is a top view of the armature of FIG. 3 showing the configuration of some of the laminations of such armature;

Figure 1:
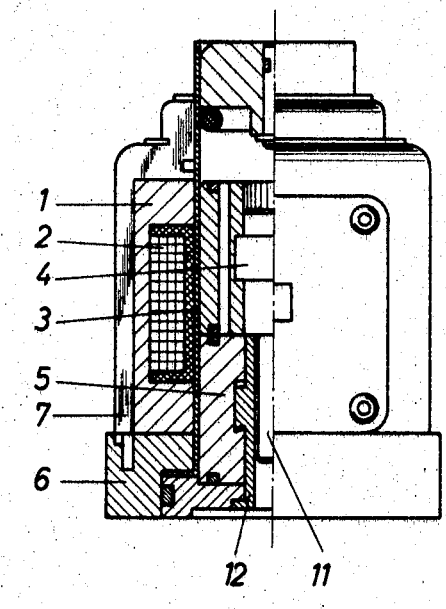
FIG. 1 is a view, partly sectioned, of an embodiment of the apparatus of the present invention for effectuating an electromagnet in a pressure-tight tube.
Figure 2:
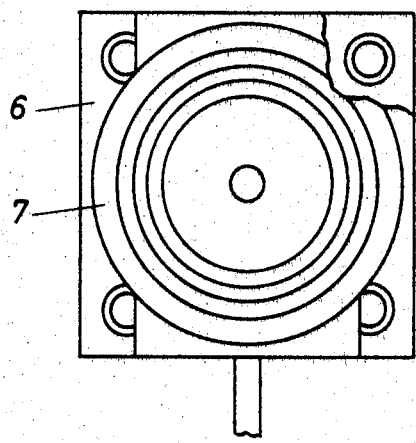
FIG. 2 is a top view, cut away at one corner, of the embodiment of FIG. 1.

FIG. 5 presents two views of the yoke of the electromagnet of the embodiment of FIG. 1; and FIG. 6 is a view partly in section and partly cut away of a portion of the yoke of the electromagnet of the embodiment of FIG. 1 viewed from the top and showing the configuration of the laminations thereof.

In the present disclosure the term "involute" and terms derived therefrom are intended to have their usual geometric meaning. Thus involute and evolvent are intended to mean a curve traced by any point of a perfectly flexible inextensible thread kept taut as it is wound upon or unwound from another curve, which other curve is called the evolute. The term "involute" and the term "evolvent" also mean the path of any point of a tangent that rolls without sliding around a curve.

In the figures, the same components are identified by the same reference numerals.

An electromagnet energized by alternating current, which may however also be energized by direct current, comprises a yoke 1 (FIGS. 1, 5 and 6) and an energizing winding 2 (FIG. 1). The yoke 1 and the energizing winding 2 are positioned outside a pressure-tight tube 3 (FIG. 1), which is preferably of hollow cylindrical configuration. The electromagnet further comprises an armature 4 (FIGS. 1, 3 and 4) and a pole core 5 (FIG. 1). The armature 4 and the pole core 5 are positioned within the pressure-tight tube 3.

The electromagnet may be utilized to control a valve or other suitable movable member. This may be accomplished by affixing the electromagnet to a base plate 6 to which the tube 3 is affixed (FIG. 1) on one side and to which a valve or other movable member may be connected or suitably positioned relative to the other side thereof. The yoke 1 and the energizing winding 2 outside the tube 3 are sealed by a suitable coat or layer of synthetic material such as, for example, cast resin 7 (FIG. 1). The layer of resin covers the yoke 1 and protects the apparatus against weather and the like.

In accordance with the invention, the armature 4 positioned within the pressure-tight tube, as shown in FIGS. 1, 3 and 4, comprises a stack of laminations 8 (FIGS. 3 and 4). The shape of each lamination 8 is curved to an involuted or evolvent configuration. The stack of laminations 8 has a plurality of bores 9 formed therethrough (FIGS. 3 and 4). The bores 9 permit the free passage of hydraulic fluid through the armature 4 and thereby permit a pressure balance to be maintained within the pressure-tight tube 3. The armature laminations 8 are held together by one or more rings or bands 10 (FIGS. 1 and 3). The rings 10 may be soldered in position and may consist of any suitable material. If the rings 10 are of copper, they may simultaneously function as short-circuit windings.

The pole core 5, positioned in the pressure-tight tube 3 (FIG. 1), also comprises a stack of lamination of involuted or evolvent configuration. The laminations of the pole core 5 may be held together by any suitable means such as, for example, rings or bands similar to the rings 10. The laminations of the armature 4 and the pole core 5 are similar to each other in configuration and position. The laminations of the armature 4 and the pole 5 are so positioned that their directions are parallel to the axis of the magnet and thus coincide in direction with the magnetic flux produced by the electromagnet. They are stacked circumferentially. That is, the laminations are so positioned that they extend substantially radially outward from the axial center of the apparatus. The laminations of the armature 4 and the pole core 5 keep iron losses low so that maximum magnetic force is provided by alternating-current energization although the structure itself is compact and small.

While the armature 4 and the pole core 5, as well as the pressure-tight tube 3, may have any suitable cross-sectional configuration, the preferred circular configuration is indicated in the figures. The involuted or evolvent configurations of the laminations of the armature 4 and the pole core 5, readily apparent in planes perpendicular to the axis of the apparatus (FIGS. 4, 6), enhances the full utilization of available space or volume by the apparatus. The configuration of the laminations of the armature 4 and pole core 5 need not be purely involuted or evolvent but may approximate such a shape.

A tappet 11 (FIGS. 1 and 3) is coaxially mounted in the armature 4 and extends into a sleeve 12 (FIG. 1) coaxially positioned within the pole core 5. The sleeve 12 is preferably of hollow cylindrical configuration and is locked in position in the pole core 5. The sleeve 12 (FIG. 1) may be made of any suitable material such as metal and may be affixed to the inside of the pole core 5 by hard solder. The sleeve 12 may also comprise soft-magnetic material, in which case a portion of the magnetic flux produced by the electromagnet flows directly into the laminations of the pole core 5 via the base plate 6. Furthermore, the sleeve 12 may comprise two parts consisting of a tubular extension and a plate riveted to each other. Such a sleeve would particularly simplify the assembly of the apparatus.

The yoke 1 of the electromagnet of the present invention, positioned outside the pressure-tight tube 3, and shown in FIGS. 1, 5 and 6, also comprises a stack of laminations 13 (FIG. 6) similar to those of the armature 4 and the pole core 5 in configuration and position. The laminations of the yoke 1 are thus of involuted or evolvent configuration. The yoke 1 may have a substantially toroidal configuration, the central axial aperture thereof accommodating the pressure-tight tube 3 (FIG. 6). The yoke 1 may also have a double U-shaped cross-sectional configuration (FIG. 1) and may comprise two parts or half-shells, each of U-shaped configuration, opening one toward the other as shown in FIG. 1. This promotes maximum utilization of the available space by providing space for the energizing winding 2 within the yoke and permits rapid and facile assembly and disassembly for rapid removal and insertion of the energizing winding 2. The yoke 1 may, of course, comprise more than two parts.

The layer 7 of plastic material, although it covers most of the outer surface of the yoke 1, does not contact the base surfaces of the yoke laminations 13 in order to provide improved magnetic conductivity in the event the energizing winding 2 is supplied with direct current. Preferably, an O-ring is inserted in the pressure-tight tube 3 (FIG. 1) to serve as a buffer stop for the armature, and another such buffer ring may be positioned on the front surface of the sleeve 12 for the pole core.

While the invention has been described by means of a specific example and in a specific embodiment, I do not wish to be limited thereto, for obvious modifications will occur to those skilled in the art without departing from the spirit and scope of the invention.

I claim:

1. Electromagnet for actuating a movable member within a pressure-tight tube, said electromagnet having a magnetic circuit comprising a yoke, a pole core and an armature as magnetic circuit members, said pole core and said armature being positioned in said pressure-tight tube, and an energizing winding and said yoke being positioned outside said pressure-tight tube in operative proximity with said pole core and said armature, at least one of said magnetic circuit members being formed substantially of a stack of magnetizable laminations, said laminations being disposed substantially radially to the axis of said tube and having a cross section of substantially involuted configuration.

2. Electromagnet as claimed in claim 1, wherein each of said pole core and said armature comprises a stack of said laminations.

3. Electromagnet as claimed in claim 2, wherein each of said pole core, said armature and said yoke comprises a stack of said laminations.

4. Electromagnet as claimed in claim 1, comprising ring means around said stack of laminations for holding the laminations of said stack together.

5. Electromagnet as claimed in claim 2, wherein the laminations of both of the stacks of laminations are similar in configuration and position.

6. Electromagnet as claimed in claim 2, comprising a sleeve in said pole core and a tappet mounted in and extending from said armature, said tappet extending into said sleeve.

7. Electromagnet as claimed in claim 2, wherein said yoke has a double U-shaped cross-sectional configuration.

8. Electromagnet as claimed in claim 2, comprising a coat of synthetic material on said yoke.

9. Electromagnet as claimed in claim 1, wherein each of said yoke and said armature comprises a stack of said laminations.

References Cited

UNITED STATES PATENTS

| 3,050,663 | 8/1962 | Zipper | 335—251 |
| 3,166,692 | 1/1965 | Forrester et al. | 335—251 |
| 3,327,264 | 6/1967 | Rodaway | 335—243 XR |
| 3,381,250 | 4/1968 | Weathers | 335—262 XR |

GEORGE HARRIS, Primary Examiner

U.S Cl. X.R.

335—260